US005621249A

United States Patent [19]

Shiga et al.

[11] Patent Number: 5,621,249

[45] **Date of Patent: *Apr. 15, 1997**

[54] STARTER FOR AN ENGINE HAVING A PINION MOVING MEMBER

[75] Inventors: Tsutomu Shiga, Nukata-gun; Nobuyuki Hayashi, Nagoya; Masanori Ohmi, Anjo; Masami Niimi, Handa, all of Japan

[73] Assignee: Nippondenso Co., Ltd., Kariya, Japan

[ * ] Notice: The term of this patent shall not extend beyond the expiration date of Pat. No. 5,508,566.

[21] Appl. No.: 378,004

[22] Filed: Jan. 25, 1995

[30] Foreign Application Priority Data

Sep. 19, 1994 [JP] Japan .................................... 6-222322

[51] Int. Cl.[6] ................................ F02N 11/00; H02P 9/04

[52] U.S. Cl. ........................................... 290/38 R; 290/48

[58] Field of Search ................................ 290/38 R, 38 A, 290/38 B, 38 C, 38 D, 38 E, 48; 74/6, 7 R, 7 A–7 E, 8, 9

[56] References Cited

U.S. PATENT DOCUMENTS

| | | | |
|---|---|---|---|
| 1,349,866 | 8/1920 | Woolson | 290/38 R |
| 1,941,698 | 1/1934 | Lock | 290/38 C |
| 2,141,331 | 12/1938 | Allen | 290/38 B |
| 2,233,595 | 3/1941 | Elkin | 290/38 R |
| 2,302,325 | 11/1942 | Janes | 290/38 A |
| 2,332,086 | 10/1943 | Jones | 290/38 A |
| 2,342,632 | 2/1944 | Hood | 290/38 A |
| 2,882,521 | 4/1959 | Mendenhall | 340/517 |
| 2,925,810 | 2/1960 | Mendenhall | 123/179.3 |
| 3,062,966 | 11/1962 | Merriam, Jr. | 290/38 A |
| 3,177,357 | 4/1965 | Seilly | 362/427 |
| 3,496,759 | 2/1970 | Buxton | 74/7 R |
| 4,855,609 | 8/1989 | Eguchi | 290/48 |
| 4,918,324 | 4/1990 | Isozumi | 290/48 |
| 5,443,553 | 8/1995 | Shiga | 74/7 R |
| 5,508,566 | 4/1996 | Nagao | 290/38 R |
| 5,508,577 | 4/1996 | Shiga | 310/201 |

FOREIGN PATENT DOCUMENTS

| | | |
|---|---|---|
| 2552823 | 4/1985 | France . |
| 2625770 | 7/1989 | France . |
| 390972 | 4/1933 | United Kingdom . |
| 614201 | 12/1948 | United Kingdom . |
| 1145737 | 3/1969 | United Kingdom . |

*Primary Examiner*—Steven L. Stephan
*Assistant Examiner*—Christopher Cuneo
*Attorney, Agent, or Firm*—Cushman Darby & Cushman IP Group of Pillsbury Madison & Sutro LLP

[57] ABSTRACT

A starter which reduces the number of parts for a pinion rotation regulation and provides an accurate magnet switch operation. A concave portion is formed on the bottom side of a plunger to store a spherical body set on the rear end of a cord-shaped member, e.g., wire. A male screw is formed on the inner wall of the concave portion, and a fixing screw that fixes the spherical body is screwed into this male screw so that the length of the cord-shaped member is adjusted. The length of the string-shaped member is adjusted so that when a plunger shaft moves upward and a lower movable contact contacts a terminal bolt, the claw of the pinion rotation regulating member fits into the notch on the outer circumference of a pinion gear. Furthermore, the claw is is fit into the notch via the wire when the plunger moves.

16 Claims, 12 Drawing Sheets

STARTER FOR AN ENGINE HAVING A PINION MOVING MEMBER

CROSS REFERENCE TO RELATED APPLICATION

This application is based and claims priority of Japanese Patent Application No. 6-222322 filed Sep. 19, 1994, the content of which is included herein.

BACKGROUND OF THE INVENTION

1. Field of the Invention

The present invention generally relates to a starter for starting engines.

2. Related Art

As disclosed in U.K. Patent No. 390,972, the conventional starter conveyed the rotation of a starter motor to a ring gear via a pinion. With this structure, a lever is rotated with movement of a magnet switch plunger and a friction member on the lever is press-fit against the pinion. Using the frictional force of the friction member and pinion, the pinion is advanced with the rotation of a shaft by the motor, and the pinion and ring gear are engaged. In other words, by rotating the lever together with the movement of the magnet switch plunger, the friction member is press-fit with the pinion.

However, with the conventional structure, a link mechanism and lever are used as the mechanism to press-fit the friction member with the pinion. This not only increases the number of parts, but the magnet switch needs to be arranged near the pinion to lay out the link mechanism and lever, by that restricting freedom in the magnet switch layout. Furthermore, if the pinion engages the ring gears and does not return, the plunger does not return to the original position because the brush is directly coupled with the lever and link mechanism. As a result, the plunger movable contact continuously contacts the fixed contact and the motor rotation cannot be stopped.

SUMMARY OF THE INVENTION

In view of the above problem, the present invention has a primary object to simplify the number of component parts and provide an accurate magnet switch operation.

According to the present invention, a pinion is moved to a ring gear side according to the movement of a magnet switch plunger by a pinion movement means via the wire or cord-shaped member. Therefore, the conventional link mechanism and levers, etc., are not required allowing the number of component parts to be reduced. Furthermore, even if the pinion engages with the ring gear and does not separate from the ring gear, the plunger returns to the original position due to the slackening of the cord-shaped member. Therefore, a movable contact accurately separates from a fixed contract in the magnet switch allowing the electric power to the starter motor to be prevented.

Preferably, a regulating member only needs to be fit to a groove portion on the pinion, so the regulating member can be accurately moved to the pinion side with the cord-shaped member.

More preferably, by using a wire for the cord-shaped member, the durability of coupling can be improved.

Still more preferably, the length of the cord-shaped member can be easily determined by placing an adjustment mechanism between the plunger and the cord-shaped member.

Still more preferably, the length of the cord-shaped member can be easily adjusted by screwing the adjustment member into a hole within the adjustment mechanism.

Still more preferably, by passing the cord-shaped member between a field magnetic pole of the starter motor, a space for laying the cord-shaped member does not need to be separately prepared, and thus, the entire starter is not large. Further, by placing the magnet switch on the axially opposite side of the pinion of the starter motor, the radial direction size of the starter can also be reduced.

DETAILED DESCRIPTION OF THE PRESENTLY PREFERRED EMBODIMENTS

Figure 1:
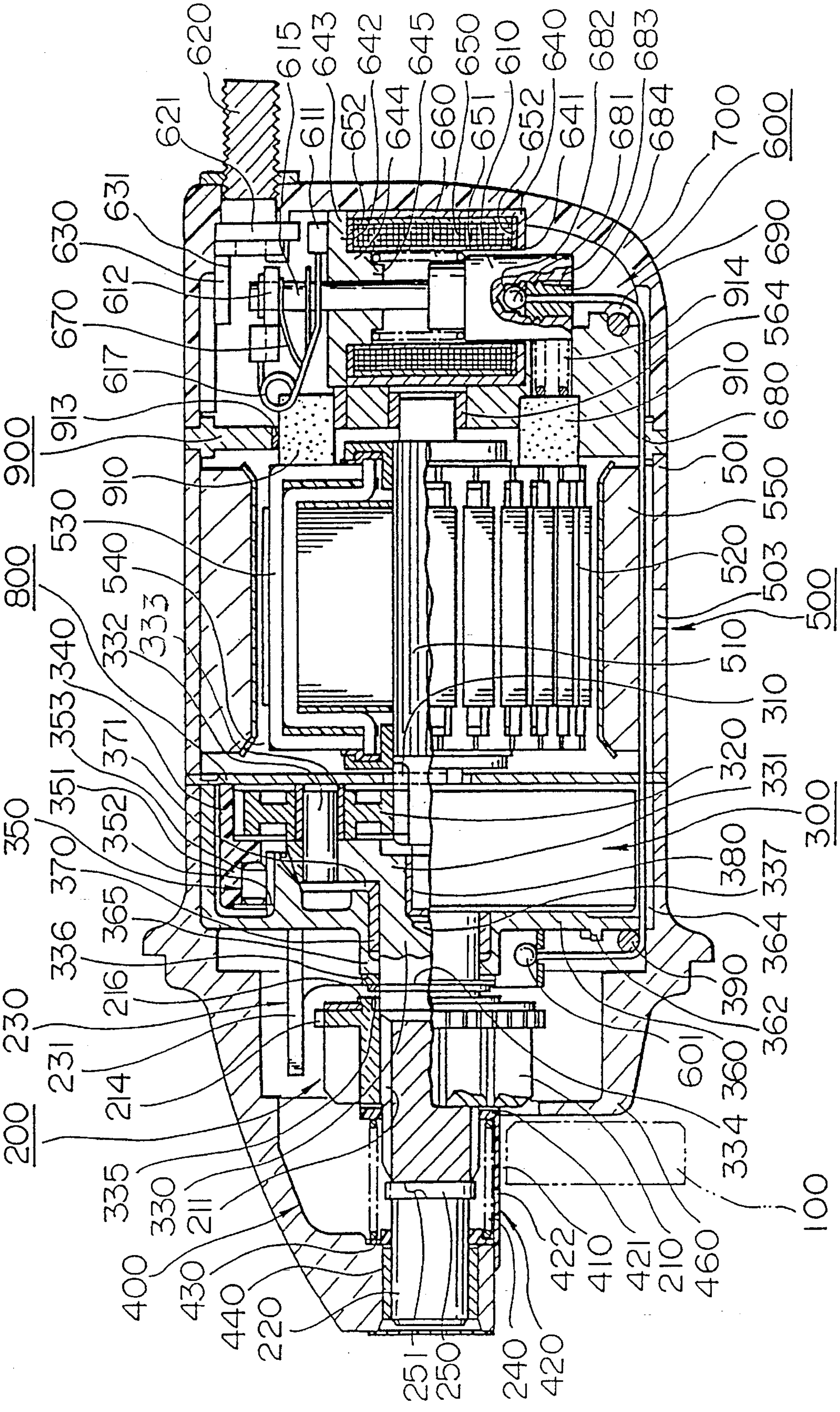
FIG. 1 is a sectional side view showing the first embodiment of a starter of the present invention.

Next, the starter of this invention will be described based on the first embodiment shown in FIG. 1 through FIG. 15.

The starter can be generally divided into a housing 400 containing a pinion 200 which meshes with a ring gear 100 mounted on an engine (not shown) and a planetary gear speed reduction mechanism 300, a motor 500, and an end frame 700 containing a magnet switch 600. Inside the starter, the housing 400 and the motor 500 are separated by a motor spacer wall 800, and the motor 500 and the end frame 700 are separated by a brush holding member 900.

(Description of the Pinion 200)

Figure 3A:
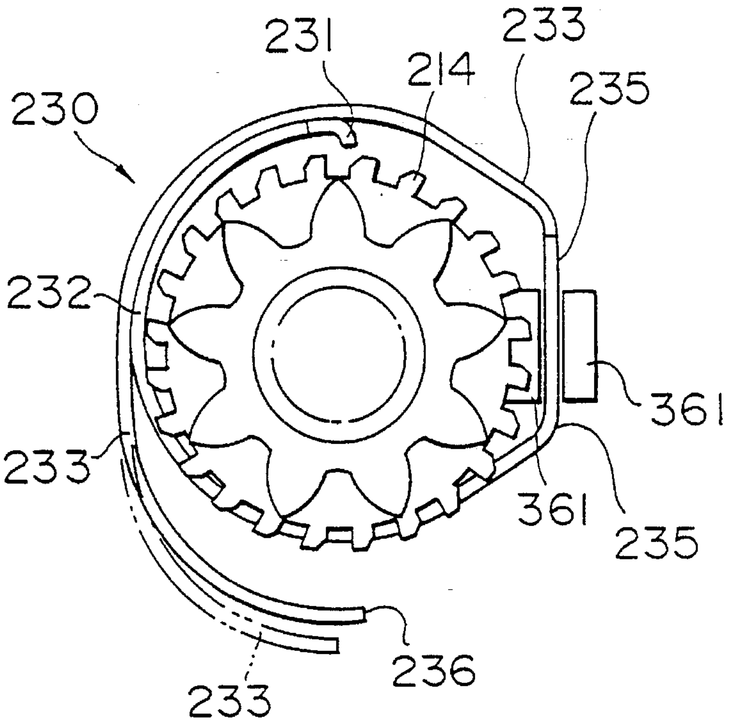
FIGS. 3A and 3B are a front view and a partial sectional side view of a pinion rotation regulating member fitted to a pinion part.
Figure 3B:
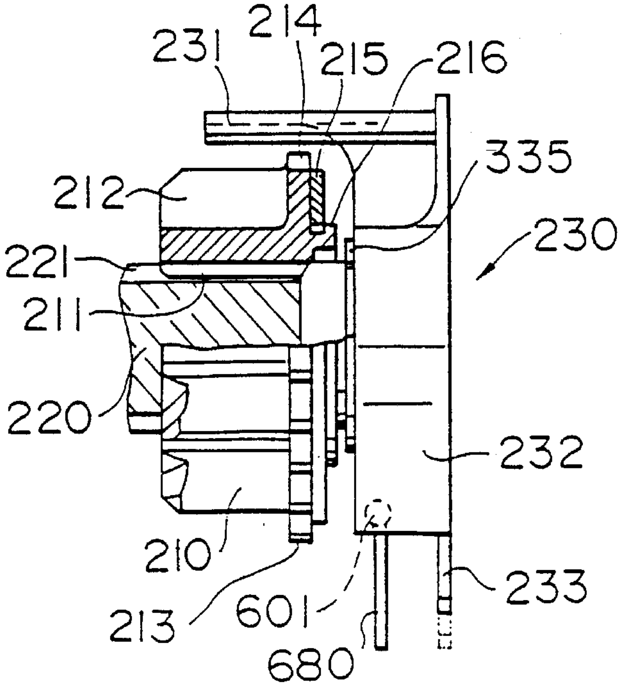

As shown in FIG. 1 and further in detail in FIGS. 3A and 3B, a pinion gear 210 which meshes with the ring gear 100 of the engine is formed on the pinion 200.

A pinion helical spline 211 which mates with a helical spline 221 formed on an output shaft 220 is formed around the inner surface of the pinion gear 210.

On the opposite side of the pinion gear 210 from the ring gear 100 a flange 213 of greater diameter than the external diameter dimension of the pinion gear 210 is formed in circular form. A number of projections 214 greater than the number of outer teeth of the pinion gear 210 are formed around the entire outer circumference of this flange 213. These projections 214 are for a regulating claw 231 of a pinion rotation regulating member 230 which will be discussed later to mate with. A washer 215 is bent onto the outer peripheral side of an annular portion 216 formed on the rear end of the pinion gear 210 and thereby disposed rotatably and unable to come off in the axial direction on the rear surface of the flange 213.

By the rotatable washer 215 being mounted on the rear surface of the flange 213 of the pinion gear 210 in this way, when a pinion rotation regulating member 230 which will be discussed later drops in behind the pinion gear 210, the front end of a regulating claw 231 of the pinion rotation regulating member 230 abuts with the washer 215. As a result, the rotation of the pinion gear 210 does not directly abut with the regulating claw 231 of the pinion rotation regulating member 230, and the washer 215 rotates relatively and the pinion gear 210 is prevented from being worn by the regulating claw 231 of the pinion rotation regulating member 230.

The pinion gear 210 is urged toward the rear of the output shaft 220 at all times by a return spring 240 consisting of a compression coil spring. The return spring 240 not only urges the pinion gear 210 directly but in this embodiment urges the pinion gear 210 by way of a ring body 421 of a shutter 420 which opens and closes an opening portion 410 of the housing 400 and will be further discussed later.

(Description of the Pinion Rotation Regulating Member 230)

Figure 2:
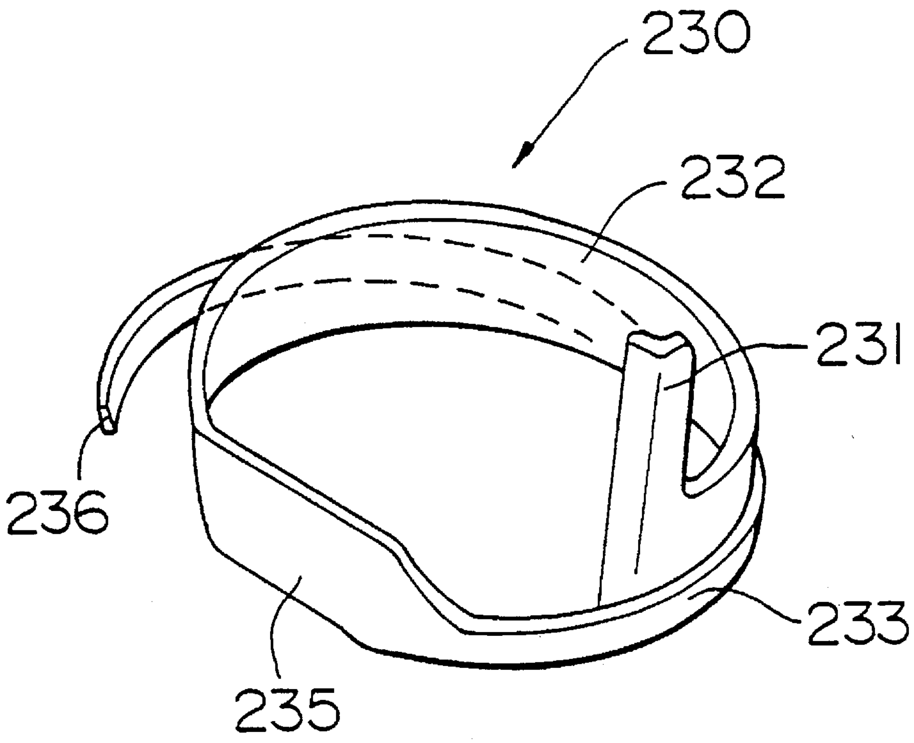
FIG. 2 is a perspective view of a pinion rotation regulating member.

The pinion rotation regulating member 230 constituting pinion moving means, as shown in FIG. 2 and FIGS. 3A and 3B in detail, is a sheet spring member wound through approximately 3/2 (i.e., 1.5) turns of which approximately 3/4 turns is a rotation regulating portion 232 of long axial sheet length and high spring constant and the remaining approximately 3/4 turns is a return spring portion 233 constituting urging means of short axial sheet length and low spring constant.

A regulating claw 231 which constitutes a regulating portion extending in the axial direction and which mates with the multiple projections 214 formed in the flange 213 of the pinion gear 210 is formed at one end of the rotation regulating portion 232. This regulating claw 231, as well as mating with the projections 214 of the pinion gear 210, in order to increase the rigidity of the regulating claw 231, is formed axially long and is bent radially inward into a cross-sectional L-shape and is bar-like.

The rotation regulating portion 232 is provided with a straight portion 235 which extends vertically. This straight portion 235 is vertically slidably supported by two supporting arms 361 mounted projecting from the front surface of a center bracket 360. That is, the straight portion 235 moving vertically causes the rotation regulating portion 232 to move vertically also.

Also, a sphere 601 of the front end of a cord-shaped member 680 (for example a wire), which will be further discussed later, for transmitting the movement of the magnet switch 600, which will be further discussed later, is in engagement with the position 180° opposite the regulating claw 231 of the rotation regulating portion 232.

The end portion side of the return spring portion 233 has a large radius of curvature and one end portion 236 of the return spring portion 233 abuts with the upper surface of a regulating shelf 362 mounted projecting from a front surface of a lower portion of the center bracket 360.

The operation of the pinion rotation regulating member 230 will now be explained. The cord-shaped member 680 is transmitting means for transmitting the movement of the magnet switch 600 to the regulating claw 231, and the movement of the magnet switch 600 pulls the rotation regulating portion 232 downward and causes the regulating claw 231 to engage with the projections 214 on the flange 213 of the pinion gear 210. At that time, because the end portion 236 of the return spring portion 233 is in abutment with the regulating shelf 362 for position regulating, the return spring portion 233 bends. Because the regulating claw 231 is in engagement with the projections 214 on the pinion gear 210, when the pinion gear 210 starts to be rotated by way of the armature shaft 510 of the motor 500 and the planetary gear speed reduction mechanism 300, the pinion gear 210 advances along the helical spline 221 on the output shaft 220. When the pinion gear 210 abuts with the ring gear 100 and the advance of the pinion gear 210 is obstructed, further rotational force of the output shaft 210 causes the pinion rotation regulating member 230 itself to bend and the pinion gear 210 rotates slightly and meshes with the ring gear 100. When the pinion gear 210 advances, the regulating claw 231 disengages from the projections 214, the regulating claw 231 drops in behind the flange 213 of the pinion gear 210, the front end of the regulating claw 231 abuts with the rear surface of the washer 215 and prevents the pinion gear 210 from retreating under the rotation of the ring gear 100 of the engine.

As the movement of the magnet switch 600 stops and the cord-shaped member 680 stops pulling the rotation regulating portion 232 downward, the action of the return spring portion 233 causes the rotation regulating portion 232 to return to its original position.

In this way, the pinion rotation regulating member 230, although it is one spring member, performs the three operations that are the operation of regulating the rotation of the pinion gear 210 and advancing the pinion gear 210, the operation of dropping in behind the pinion gear 210 and preventing the pinion gear 210 from retracting, and the operation of returning the rotation regulating portion 232. That is, because a plurality of operations are carried out by one part, the number of parts in the starter can be reduced and the assemblability can be improved.

Also, when the pinion rotation regulating member 230 abuts with the pinion gear 210 and by means of the rotation of the output shaft 220, while moving the pinion gear 210 to the ring gear 100 side, the pinion gear 210 abuts with the ring gear 100, because the pinion rotation regulating member 230 itself bends and rotates the pinion gear 210 slightly and causes it to mesh with the ring gear, there is no production of abrasion powder and there are few parts and the construction can be made simple.

Also, the pinion rotation regulating member 230, because the projecting parts of the projections 214 of the pinion gear 210 are more numerous than the teeth of the pinion gear 210, can easily engage with the projections 214.

Because the pinion rotation regulating member 230 need only be held with the small force required to regulate the rotation of the pinion gear 210, it is possible to move it to the pinion gear 210 side by means of the magnet switch 600, using the cord-shaped member 680, and consequently it is possible to increase the freedom with which the magnet switch 600 is disposed.

Also, the pinion rotation regulating member 230 itself can prevent the pinion gear 210 from returning when the pinion gear 210 has meshed with the ring gear 100, and the number of parts can be made small and the assembly can be simplified.

Furthermore, because the pinion rotation regulating member 230 itself integrally comprises the return spring portion 233 constituting urging means urging to the opposite side to the pinion gear, by switching the magnet switch 600 OFF, the pinion rotation regulating member 230 automatically moves away from the pinion gear 210 and the number of parts can be made small and the assembly can be simplified.

By part of the pinion rotation regulating member 230 having the regulating claw 231 constituting the bar-like elastic regulating portion, the pinion rotation regulating member itself can reliably bend.

Also, by the washer 215 being rotatably held on the end surface of the pinion gear 210, even when the pinion gear 210 is over-run by the ring gear 100 and rotates at high speed, because the washer 215 is rotatable with respect to the pinion gear 210, the abutting portion of the regulating claw 231 constituting the regulating portion is not worn much, and the durability can be increased.

(Description of the Pinion Stopping Ring 250)

The pinion stopping ring 250 is fixed in a circular groove of rectangular cross-section formed around the output shaft 220. This pinion stopping ring 250 is a piece of steel of rectangular cross-section processed into a circular shape; a substantially S-shaped corrugation 251 (an example of engaging means) is formed at each end, and the convex portion of one is in engagement with the concave portion of the other and the convex portion of the other is in engagement with the concave portion of the first.

(Description of the Planetary Gear Speed Reduction Mechanism 300)

The planetary gear speed reduction mechanism 300, as shown in FIG. 1, is speed reducing means for reducing the rotational speed of the output shaft 220 relative to motor 500, which will be further discussed later, and increasing the output torque of the motor 500. The planetary gear speed reduction mechanism 300 is made up of a sun gear 310 formed on the front-side outer periphery of the armature shaft 510 (discussed later) of the motor 500, a plurality of planetary gears 320 which mesh with this sun gear 310 and rotate around the circumference of the sun gear 310, a planet carrier 330 which rotatably supports these planetary gears 320 around the sun gear 310 and is formed integrally with the output shaft 220, and an internal gear 340 which is of a cylindrical shape meshing with the planetary gears 320 at the outer periphery of the planetary gears 320 and is made of resin.

(Description of the Overrunning Clutch 350)

The overrunning clutch 350 supports the internal gear 340 rotatably in one direction only (only the direction in which it rotates under the rotation of the engine). The overrunning clutch 350 has a clutch outer 351 constituting a first cylindrical portion integrally formed in the front side of the internal gear 340, a circular clutch inner 352 constituting a second cylindrical portion formed in the rear surface of the center bracket 360 constituting a fixed side covering the front of the planetary gear speed reduction mechanism 300 and disposed facing the clutch outer 351, and a roller 353 accommodated in a roller housing portion formed inclined to the inner surface of the clutch outer 351.

(Description of the Center Bracket 360)

Figure 4:
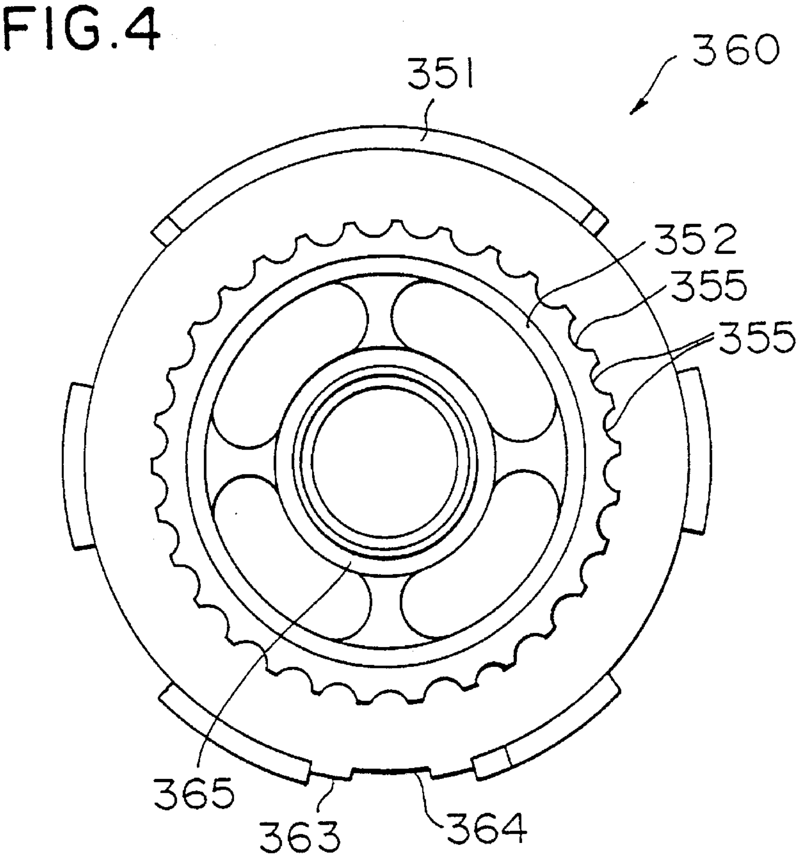
FIG. 4 is a rear view of a center bracket.
Figure 5:
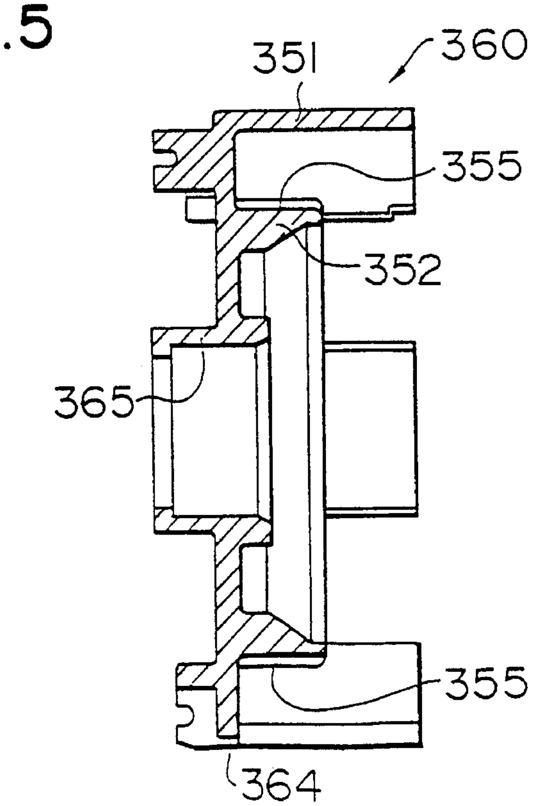
FIG. 5 is a sectional side view of a center bracket.
Figure 6:
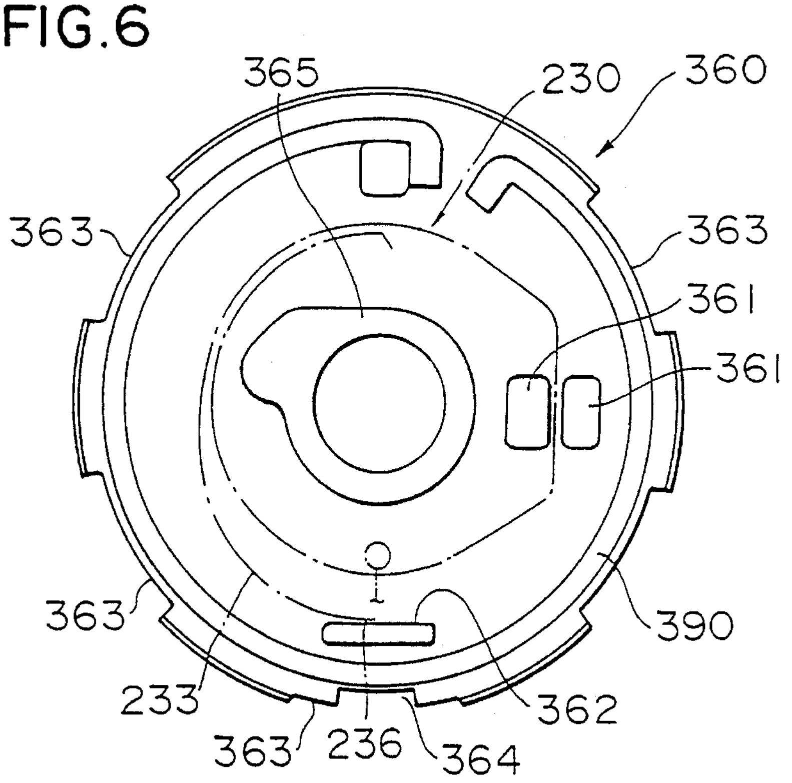
FIG. 6 is a front view of a center bracket.

The center bracket 360 is shown in detail in FIG. 4 through FIG. 6 and is disposed inside the rear end of the housing 400. The housing 400 and the center bracket 360 are linked by a ring spring 390 having one end engaged with the housing 400 and the other end engaged with the center bracket 360 and are arranged in such a way that the rotational reaction received by a clutch inner 352 constituting the overrunning clutch 350 is absorbed by the ring spring 390 and the reaction is not directly transmitted to the housing 400.

Also, two supporting arms 361 which hold the pinion rotation regulating member 230 and a regulating shelf 362 on which the lower end of the pinion rotation regulating member 230 is loaded are mounted on the front surface of the center bracket 360. Further, a plurality of cutout portions 363 which mate with convex portions (not shown in the drawings) on the inner side of the housing 400 are formed around the center bracket 360. The upper side cutout portions 363 are used also as air passages for guiding air from inside the housing 400 into a yoke 501. Also, a concave portion 364 through which the cord-shaped member 680 (discussed later) passes in the axial direction is formed at the lower end of the center bracket 360.

(Description of the Planet Carrier 330)

The planet carrier 330 is provided at its rear end with a flange-like projecting portion 331 which extends radially in order to support the planetary gears 320. Pins 332 extending rearward are fixed to this flange-like projecting portion 331, and these pins 332 rotatably support the planetary gears 320 by way of metal bearings 333.

The planet carrier 330 has its front end rotatably supported by a housing bearing 440 fixed inside the front end of the housing 400 and a center bracket bearing 370 fixed inside an inner cylindrical portion 365 of the center bracket 360.

(Description of the Housing 400)

The housing 400 supports the output shaft 220 with the housing bearing 440 fixed in the front end of the housing 400 and also is provided with a water barrier wall 460 which in order to minimize the incursion of rainwater and the like through the opening portion 410 minimizes the gap at the lower part of the opening portion 410 between the outer diameter of the pinion gear 210 and the housing 400. Also, two slide grooves extending axially are provided at the lower part of the front end of the housing 400, and a shutter 420 which will be further discussed later is disposed in these slide grooves.

(Description of the Shutter 420)

The shutter 420 consisting of a resinous member (for example nylon) is mounted on the output shaft 220 and comprises a ring body 421 sandwiched between the return spring 240 and the pinion gear 210 and a water-barrier portion 422 which opens and closes an opening portion 410 in the housing 400. The operation of the shutter 420 is such that when the starter starts to operate and the pinion gear 210 shifts forward along the output shaft 220 the ring body 421 shifts forward together with the pinion gear 210. When this happens, the water-barrier portion 422 integral with the ring body 421 shifts forward and opens the opening portion 410 of the housing 400. When the starter stops operating and the pinion gear 210 shifts backward along the output shaft 220, the ring body 421 also shifts backward together with the pinion gear 210. When this happens, the water-barrier portion 422 integral with the ring body 421 also shifts backward and closes the opening portion 410 of the housing 400. As a result, the shutter 420, which constitutes opening and closing means, by means of the water-barrier portion 422 prevents rainwater and the like which is splashed by the centrifugal force of the ring gear 100 from getting inside the housing 400 when the starter is not operating.

(Description of the Motor 500)

The motor 500 is enclosed by a yoke 501 having a through hole 503, motor spacer wall 800, and a brush holding member 900 which will be discussed later. The motor spacer wall 800 houses the planetary gear speed reduction mechanism 300 between itself and the center bracket 360, and also fulfills the role of preventing lubricating oil inside the planetary gear speed reduction mechanism 300 from getting into the motor 500.

The motor 500, as shown in FIG. 1, is made up of an armature 540 comprising the armature shaft 510 and an armature core 520 and armature coils 530 which are mounted on and rotate integrally with this armature shaft 510, and fixed poles 550 which rotate the armature 540, and the fixed poles 550 are mounted around the inside of the yoke 501.

(Description of the Armature Coils 530)

Figure 7:
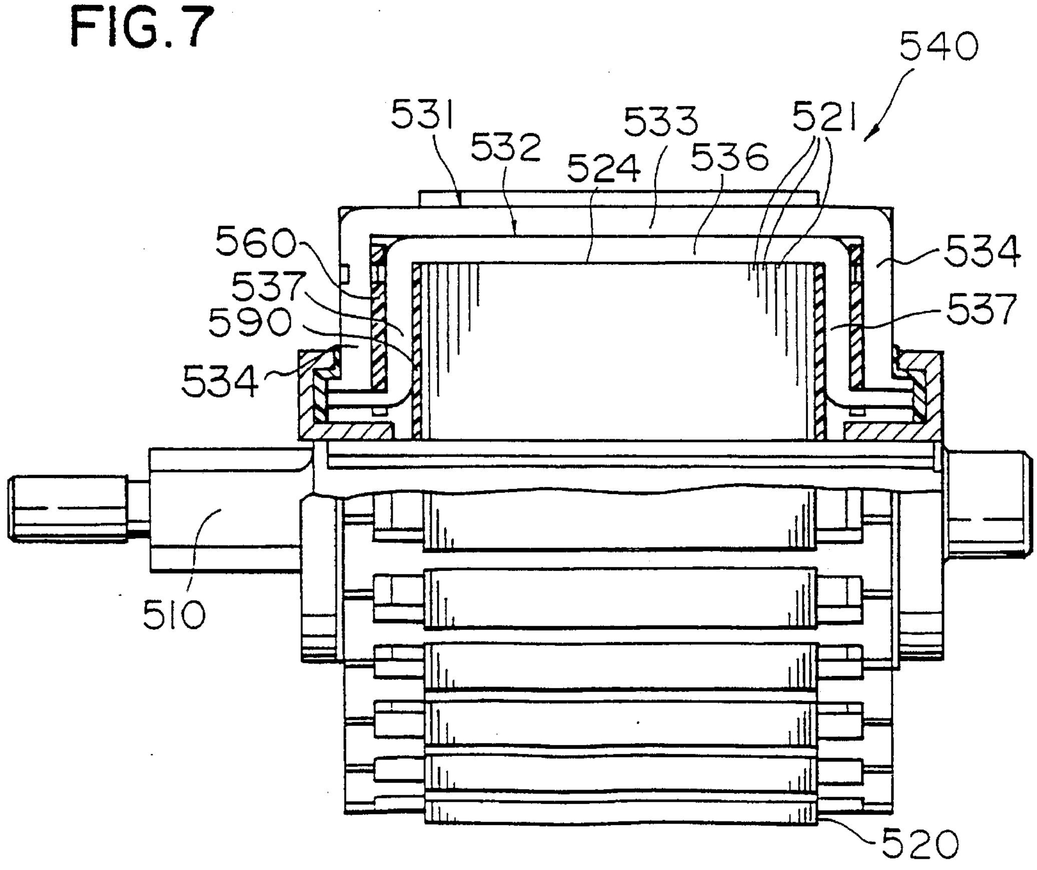
FIG. 7 is a sectional side view of an armature.

For the armature coils 530, in this embodiment shown in detail in FIG. 7, multiple (for example 25) upper layer coil bars 531 and the same number of lower layer coil bars 532 as these upper layer coil bars 531 are used, and 2-layer-winding coils wherein the respective upper layer coil bars 531 and the lower layer coil bars 532 are stacked in the radial direction are employed. The upper layer coil bars 531 and lower layer coil bars 532 are paired, and the ends of the upper layer coil bars 531 and the ends of the lower layer coil bars 532 are electrically connected to constitute ring-shaped coils.

(Description of the Upper Layer Coil Bars 531)

The upper layer coil bars 531, as shown in FIG. 7, are made of a material having excellent electrical conductivity (for example copper), and are each provided with an upper layer coil arm 533 which extends axially in parallel with the fixed poles 550 and is held in the outer sides of slots 524 and two upper layer coil ends 534 which are bent inward from both ends of the upper layer coil arm 533 and extend in a direction orthogonal to the axial direction of the armature shaft 510. The upper layer coil arm 533 and the two upper layer coil ends 534 may be a member integrally molded by cold casting, may be a member shaped by bending in a press into a U-shape, or may be a member formed by joining an upper layer coil arm 533 and two upper layer coil ends 534 made as separate parts by a joining method such as welding.

(Description of the Lower Layer Coil Bars 532)

The lower coil bars 532, like the upper coil bars 531, are made from a material having excellent electrical conductivity (for example copper), and each comprise a lower layer coil arm 536 which extends axially in parallel with respect to the fixed poles 550 and is held in the inner sides of slots 524 and two lower layer coil ends 537 which are bent inward from the ends of this lower layer coil arm 536 and extend orthogonal to the axial direction of the armature shaft 510. The lower layer coil arm 536 and the two lower layer coil ends 537, like the upper layer coil bar 531, may be a member integrally molded by cold casting, may be a member shaped by bending in a press into a U-shape, or may be a member formed by joining a lower layer coil arm 536 and 2 lower layer coil ends 537 made as separate parts by a joining method such as welding.

Insulation between the upper layer coil ends 534 and the lower layer coil ends 537 is secured by insulating spacers 560, and insulation between the lower layer coil ends 537 and the armature core 520 is secured by an insulating ring 590 made of resin (for example nylon or phenol resin).

(Description of the Yoke 501)

Figure 8:
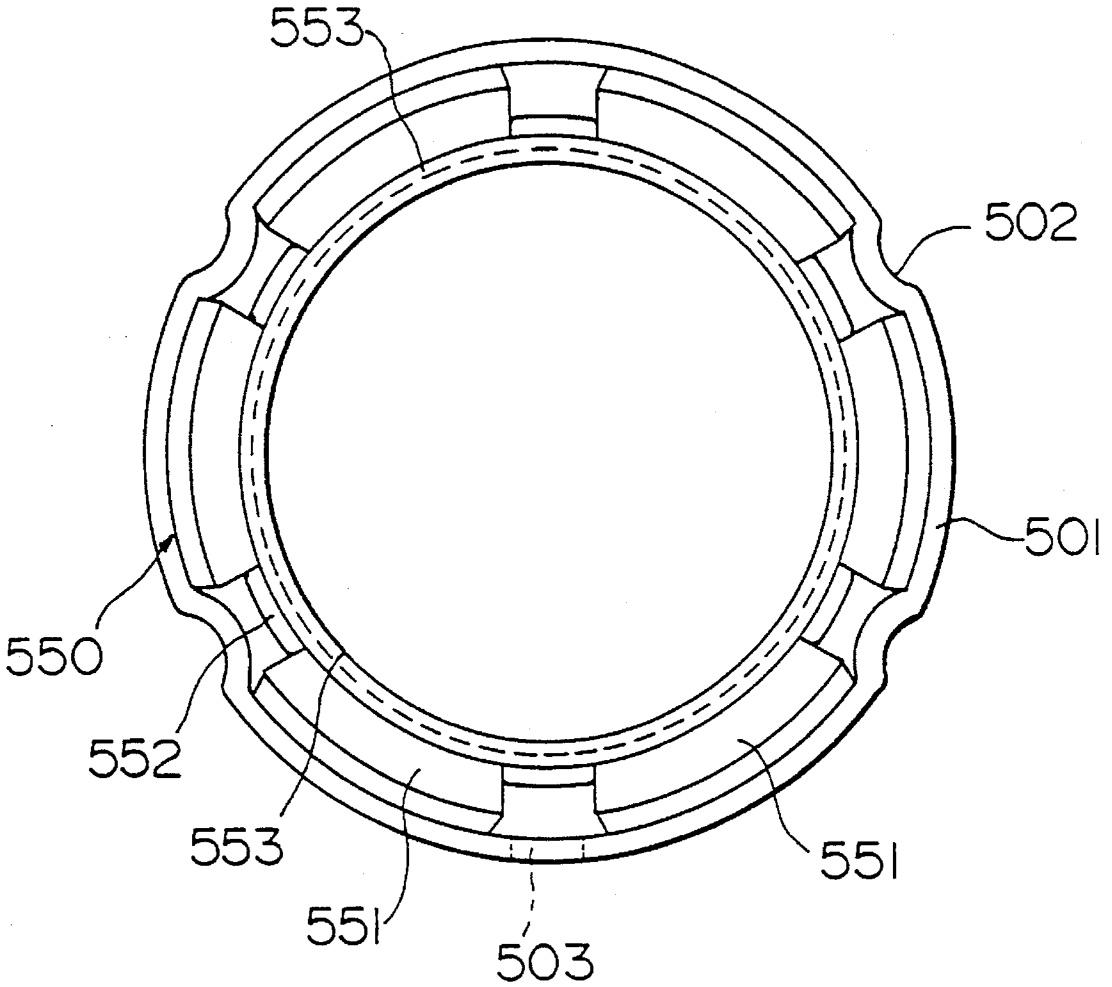
FIG. 8 is a front view of a yoke.

The yoke 501, as shown in FIG. 8, is a cylindrical body formed by rolling a steel plate, and around it are formed a plurality of concave grooves 502 extending axially and sunk toward the inner circumference. These concave grooves 502, as well as disposing through bolts, are used for positioning fixed poles 550 around the inner circumference of the yoke 501.

(Description of the Fixed Poles 550)

In this embodiment permanent magnets are used for the fixed poles 550 and, as shown in FIG. 8, they comprise a plurality of (for example 6) main poles 551 and inter-pole poles 552 disposed between these main poles 551. Field coils which generate magnetic force by electrical current flow may be used instead of permanent magnets for the fixed poles 550.

The main poles 551 are positioned by the ends of the inner sides of channel grooves 502 in the above-mentioned yoke 501, and are fixed in the yoke 501 by fixing sleeves 553 disposed around the inside of the fixed poles 550 with the inter-pole poles 552 disposed between the main poles 551.

(Description of the Magnet Switch 600)

Figure 9:
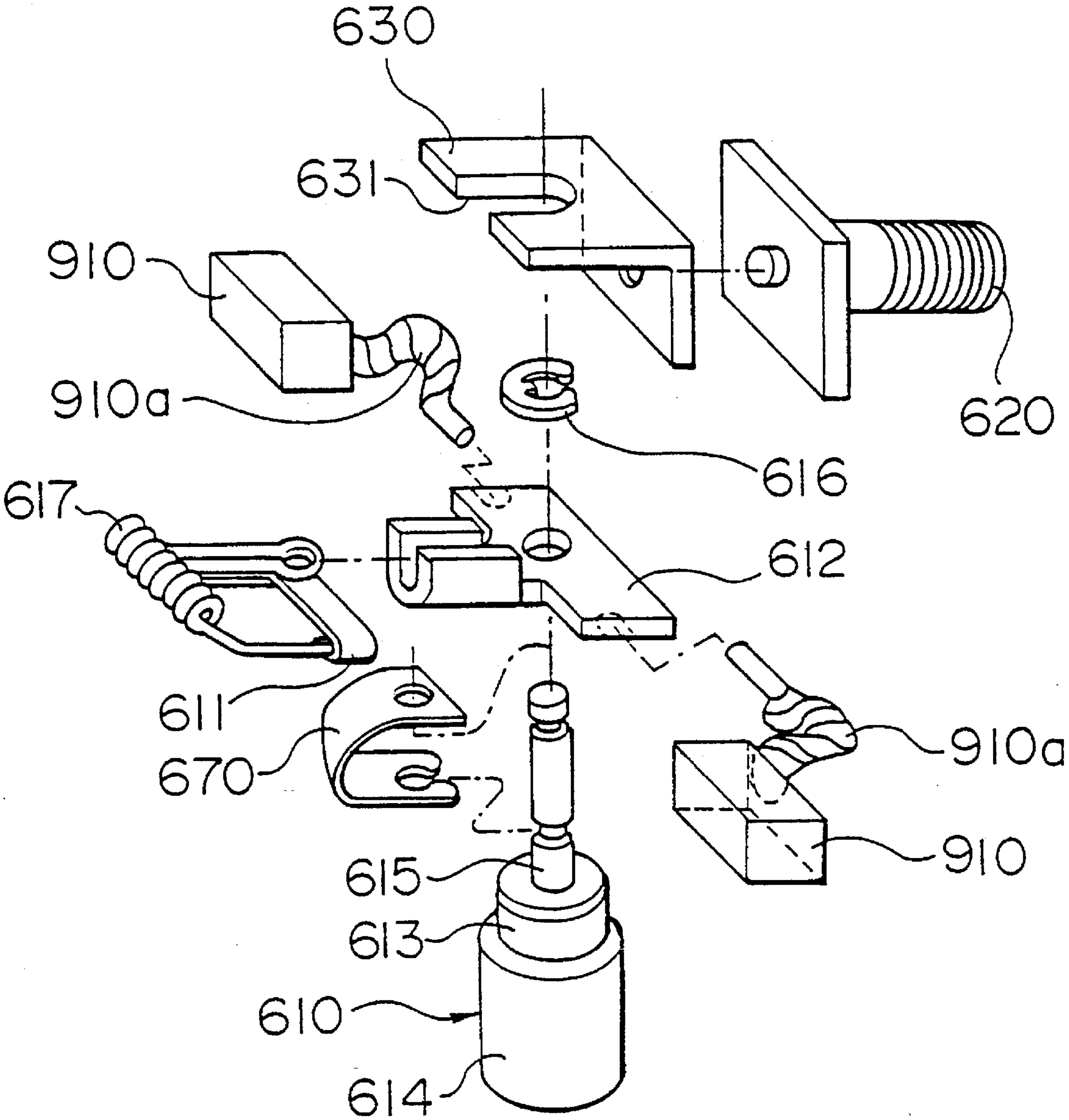
FIG. 9 is an exploded perspective view of a plunger and contact points of a magnet switch.
Figure 10:
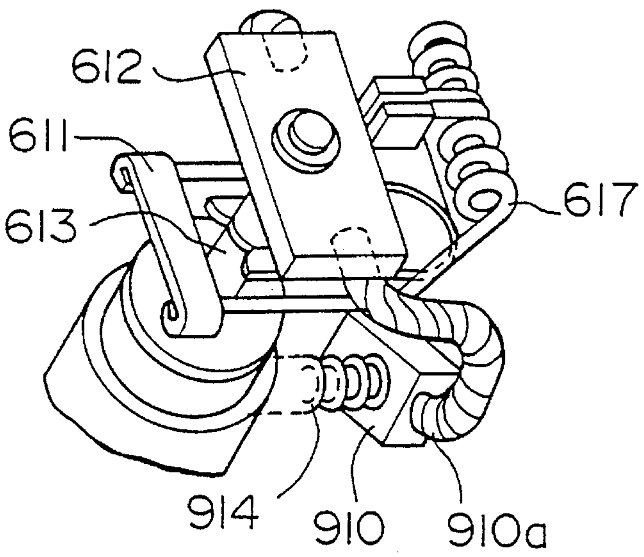
FIG. 10 is a perspective view showing a plunger of a magnet switch.

The magnet switch 600, as shown in FIG. 1, FIG. 9 and FIG. 10, is held in a brush holder 900 which will be discussed later, is disposed inside an end frame 700 which will be discussed later, and is fixed so as to be substantially orthogonal to the armature shaft 510.

In the magnet switch 600, electrical current drives a plunger 610 upward, and two contacts (a lower movable contact 611 and an upper movable contact 612) which move together with the plunger 610 are sequentially caused to abut with the head portion 621 of a terminal bolt 620 and an abutting portion 631 of a fixed contact 630. A battery cable not shown in the drawings is connected to the terminal bolt 620.

The magnet switch 600 is structured inside a magnet switch cover 640 which is cylindrical and has a bottom and is made from magnetic parts (for example made of iron). The magnet switch cover 640 is for example a pliable steel plate press-formed into a cup shape, and in the center of the bottom of the magnet switch cover 640 there is a hole 641 through which the plunger 610 passes movably in the vertical direction. Also, the upper opening of the magnet switch cover 640 is closed off by a stationary core 642 made of a magnetic body (for example made of iron).

The stationary core 642 consists of an upper large diameter portion 643, a lower middle diameter portion 644, and a still lower small diameter portion 645, and the stationary core 642 is fixed in the upper opening of the magnet switch cover 640 by the outer periphery of the large diameter portion 643 being caulked to the inner side of the upper end of the magnet switch cover 640. The upper end of an attracting coil 650 is fitted around the middle diameter portion 644. The upper end of a compression coil spring 660 which urges the plunger 610 downward is fitted around the periphery of the small diameter portion 645 of the stationary core 642.

The attracting coil 650 is attracting means which generates magnetism when a current flows through it and attracts the plunger 610, and the attracting coil 650 is provided with a sleeve 651 which has its upper end fitted to the middle diameter portion 644 of the stationary core 642 and covers the plunger 610 slidably in the vertical direction. This sleeve 651 is made by rolling up a non-magnetic thin plate (for example copper plate, brass, stainless steel), and insulating washers 652 made of resin or the like are provided at the upper and lower ends of this sleeve 651. Around the sleeve 651 between these 2 insulating washers 652 there is wound a thin insulating film (not shown in the drawings) made of resin (for example cellophane, nylon film) or paper, and around that insulating film is wound a predetermined number of turns of a thin enamel wire, whereby the attracting coil 650 is constituted.

The plunger 610 is made of a magnetic metal (for example iron) and has a substantially cylindrical shape comprising an upper small diameter portion 613 and a lower large diameter portion 614. The lower end of the compression coil spring 660 is fitted to the small diameter portion 613, and the large diameter portion 614, which is relatively long in the axial direction, is held slidably vertically in the sleeve 651.

A plunger shaft 615 extending upward from the plunger 610 is fixed to the upper end of the plunger 610. This plunger shaft 615 projects upward through a through hole provided in the stationary core 642. An upper movable contact 612 is fitted around the plunger shaft 615 above the stationary core 642 slidably vertically along the plunger shaft 615. This upper movable contact 612, as shown in FIG. 9, is limited by a stopping ring 616 fitted to the upper end of the plunger shaft 615 so that it does not move upward of the upper end of the plunger shaft 615. As a result, the upper movable contact 612 is vertically slidable along the plunger shaft 615 between the stopping ring 616 and the stationary core 642. The upper movable contact 612 is urged upward at all times by a contact pressure spring 670 consisting of a sheet plate spring fitted to the plunger shaft 615.

The upper movable contact 612 is made of a metal such as copper having excellent conductivity, and when both ends of the upper movable contact 612 move upward they abut with the two abutting portions 631 of the fixed contact 630. The lead wires 911 of a pair of brushes 910 are electrically and mechanically fixed to the upper movable contact 612 by caulking or welding or the like. Also, the end portion of a resistor member 617 constituting a plurality of (in this embodiment, two) limiting means is inserted and electrically and mechanically fixed in a groove portion of the upper movable contact 612.

The lead wires 911 are electrically and mechanically fixed to the upper movable contact 612 by caulking or welding, but the upper movable contact 612 and the lead wires 911 of the brushes 910 may alternatively be formed integrally.

The resistor member 617 is for rotating the motor 500 at low speed when the starter starts to operate, and consists of a metal wire of high resistance wound through several turns. A lower movable contact 611 located below the head portion 621 of the terminal bolt 620 is fixed by caulking or the like to the other end of the resistor member 617.

The lower movable contact 611 is made of a metal such as copper having excellent conductivity, and when the magnet switch 600 stops and the plunger 610 is in its downward position abuts with the upper surface of the stationary core 642, when the resistor member 617 moves upward along with the movement of the plunger shaft 615, before the upper movable contact 612 abuts with the abutting portion 631 of the fixed contact 630 it abuts with the head portion 621 of the terminal bolt 620.

The lower surface of the plunger 610 is provided with a recess portion 682 which accommodates a sphere 681 provided at the rear end of the cord-shaped member 680 (for example a wire). A female thread 683 is formed on the inner wall of this female thread 683. A fixing screw 684 which fixes the sphere 681 in the recess portion 682 is screwed into this recess portion 682. This fixing screw 684 is also used to perform adjustment of the length of the cord-shaped member 680, by adjusting the extent to which the fixing screw 684 is screwed into the female thread 683. The length of the cord-shaped member 680 is adjusted so that when the plunger shaft 615 moves upward and the lower movable contact 611 abuts with the terminal bolt 620 the regulating claw 231 of the pinion rotation regulating member 230 mates with the projections 214 of the outer periphery of the pinion gear 210. The female thread 683 and the fixing screw 684 constitute an adjusting mechanism.

With such a construction, because with respect to the movement of the plunger 610 of the magnet switch 600, via the cord-shaped member 680, the pinion rotation regulating member 230 is moved to the pinion gear 210 side, conventional link mechanisms and levers and the like are not necessary and the number of parts can be reduced, and also even if the pinion gear 210 fails to move away from the ring gear 100, bending in the cord-shaped member 680 itself causes the plunger 610 to return to its original position, and the upper movable contact 612 can move away from the fixed contact 630.

Also, because all that is necessary is to cause the regulating claw 231 of the pinion rotation regulating member 230 to engage with the projections 214 on the pinion gear 210, this regulating claw 231 can be reliably moved by the cord-shaped member 680.

By making the cord-shaped member 680 a wire, the durability can be increased.

Also, by disposing the adjusting mechanism consisting of the female thread 683 and the fixing screw 684 between the plunger 610 and the cord-shaped member 680 and screwing the fixing screw 684 into the female thread 683, the length of the cord-shaped member 680 can be easily adjusted.

Also, because the lead wires 910*a* of the brushes 910 are directly connected to the upper movable contact 612, heat generated at the brushes 910 is efficiently radiated via the lead wires 910*a*, the upper movable contact 612 and the terminal bolt 620 from the battery cable connected to the terminal bolt 620 and positioned outside the starter, and increases in the life of the brushes 910 can be attempted.

Furthermore, because the plunger shaft 615 of the magnet switch 600 is disposed substantially orthogonal to the motor axis, compared to a case wherein the plunger shaft 615 of the magnet switch 600 is disposed axially, the axial direction dimension of the starter can be shortened and the stroke through which the plunger shaft 615 is required to pull the cord-shaped member 680 can be set small, and further downsizing of the magnet switch 600 can be attempted.

Furthermore, because the plunger 615 of the magnet switch 600 is disposed orthogonal with respect to the axial direction of the armature shaft 510, only the diametral direction length of the magnet switch 600 adds to the axial direction length of the overall starter, and the build of the whole starter is not made large.

Furthermore, because the magnet switch 600 is housed inside the end frame 700, it does not readily suffer damage from water and the like which has entered through the opening 410 in the housing 400.

(Description of the End Frame 700)

Figure 11:
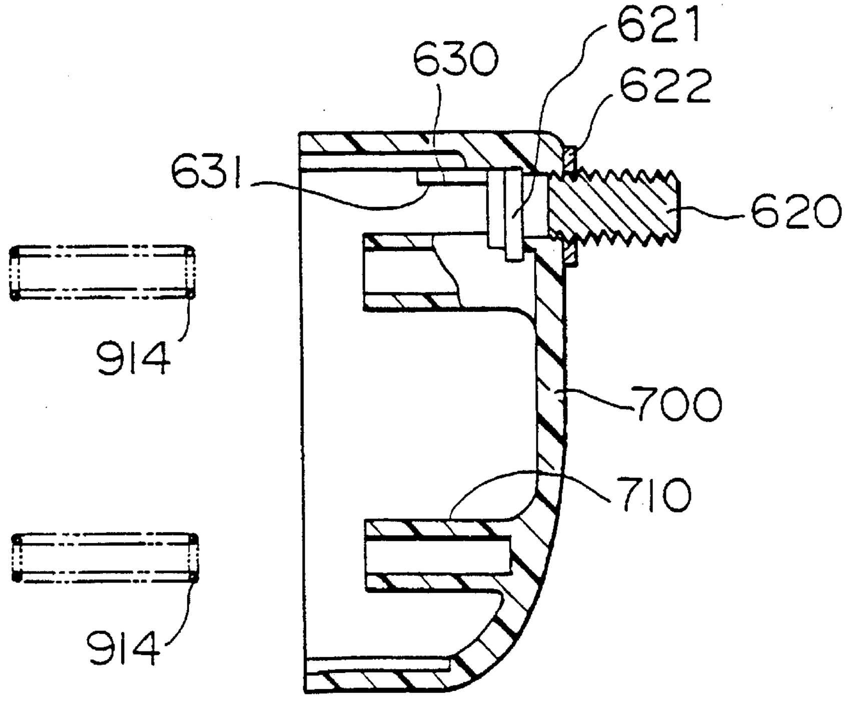
FIG. 11 is a sectional view of an end frame and a brush spring.

The end frame 700, as shown in FIG. 11, is a magnet switch cover made of resin (for example phenol resin), and accommodates the magnet switch 600.

Spring holding pillars 710 which hold compression coil springs 914 which urge the brushes 910 forward are mounted projecting from the rear surface of the end frame 700 in correspondence with the positions of the brushes 910.

Also, the compression coil springs 914, as shown in FIG. 1, are disposed radially outward with respect to the axial direction of the plunger 610 of the magnet switch 600.

The terminal bolt 620 is a steel bolt which passes through the end frame 700 from the inside and projects from the rear of the end frame 700 and has at its front end a head portion 621 which abuts with the inner surface of the end frame 700. The terminal bolt 620 is fixed to the end frame 700 by a caulking washer 622 being attached to the terminal bolt 620 projecting rearward of the end frame 700. A copper fixed contact 630 is fixed to the front end of the terminal bolt 620 by caulking. The fixed contact 630 has one or a plurality of (in this embodiment, two) abutting portions 631 positioned at the top end of the inside of the end frame 700, and these abutting portions 631 are mounted so that the upper surface of the upper movable contact 612 which is moved up and down by the operation of the magnet switch 600 can abut with the lower surfaces of the abutting portions 631.

Further, the spring length of the compression coil springs 914 can use the radial direction length of the magnet switch 600, a suitable spring stress and load can be set, and the life of the compression coil springs 914 can be greatly increased.

(Description of the Brush Holder 900)

The brush holder 900, as well as the roles of separating the inside of the yoke 501 and the inside of the end frame 700 and rotatably supporting the rear end of the armature shaft 510 by way of the brush holder bearing 564, also fulfills the role of a brush holder, the role of holding the magnet switch 600, and the role of holding a pulley 690 which guides the cord-shaped member 680. The brush holder 900 has a hole portion not shown in the drawings through which the cord-shaped member 680 passes.

Figure 12:
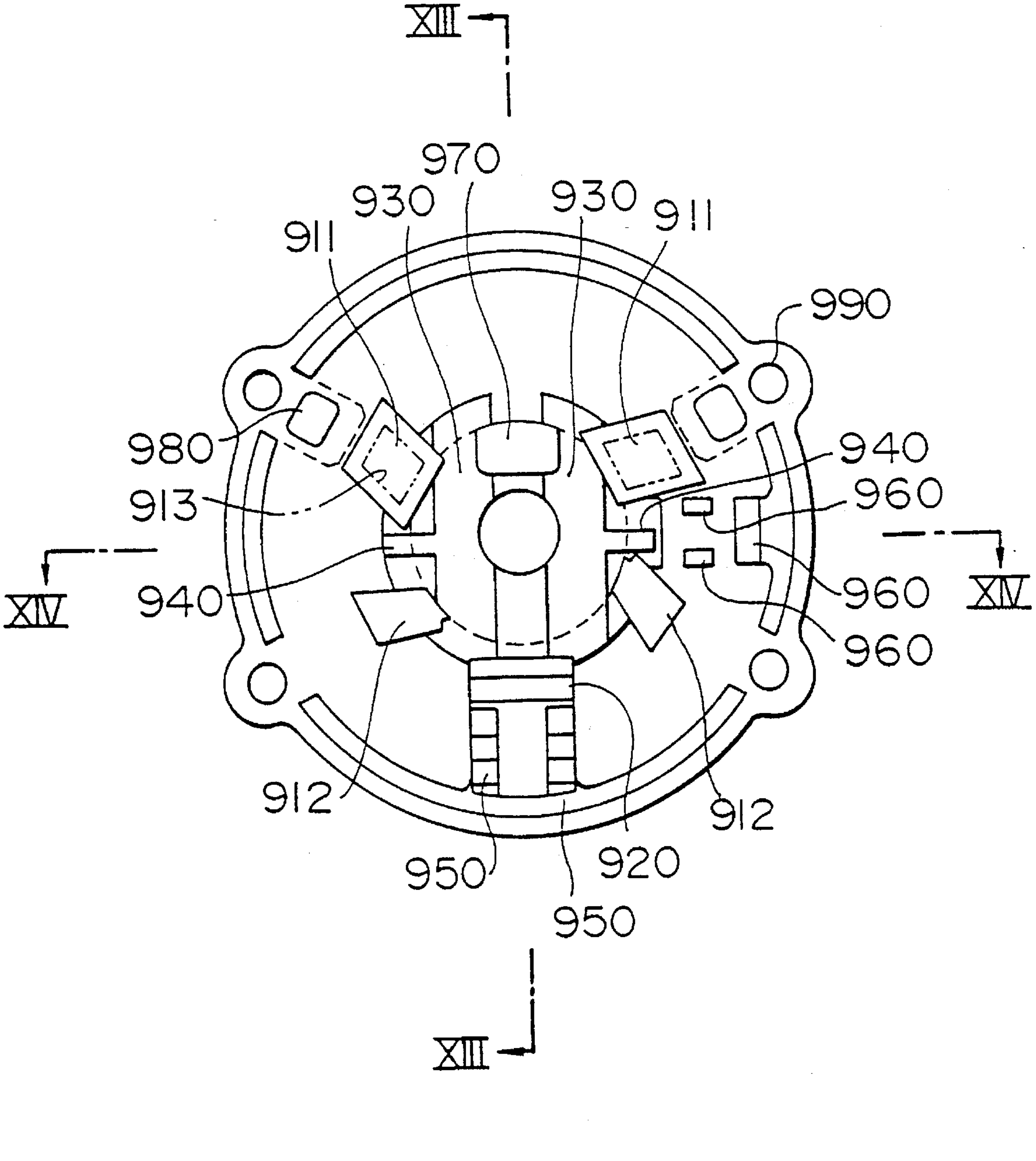
FIG. 12 is a front view of a brush holder.
Figure 13:
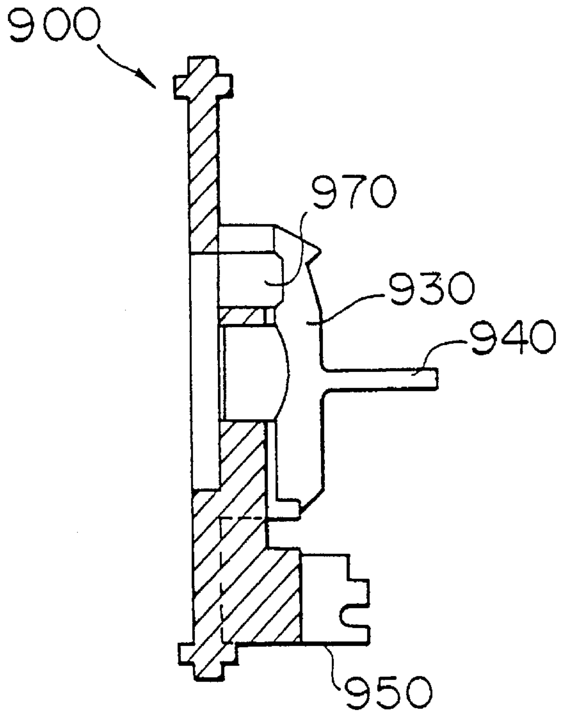
FIG. 13 is a sectional view taken along the line XIII—XIII in FIG. 12.
Figure 14:
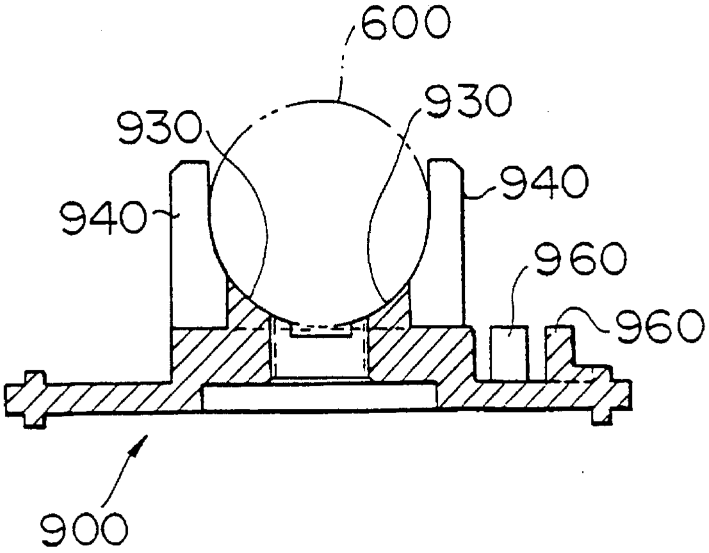
FIG. 14 is a sectional view taken along the line XIV—XIV in FIG. 12.

The brush holder 900 is a spacing wall made of a metal such as aluminum molded by a casting method and, as shown in FIG. 12 through FIG. 14, has a plurality of (in this embodiment, two upper and two lower) brush holding holes 911, 912 which hold the brushes 910 in the axial direction. The upper brush holding holes 911 are holes which hold brushes 910 which receive a plus voltage, and these upper brush holding holes 911 hold the brushes 910 by way of resin (for example nylon, phenol resin) insulating cylinders 913 (FIG. 13 is a cross-section taken along XIII—XIII of FIG. 12, and FIG. 14 is a cross-section taken along XIV—XIV of FIG. 12). The lower brush holding holes 912 are holes which hold brushes 910 connected to ground, and these lower brush holding holes 912 hold the respective brushes 910 directly therein.

In this way, by holding the brushes 910 by means of the brush holder 900, there is no need to provide the starter with independent brush holders. As a result, the number of parts in the starter can be reduced and assembly man-hours can be reduced.

The brushes 910 are urged against the upper layer coil ends 534 at the rear ends of the armature coils 530 by the compression coil springs 914.

The lead wires **910*a* of the upper brushes 910 are electrically and mechanically joined by a joining method such as welding or caulking to the upper movable contact 612 which is moved by the magnet switch 600. The lead wires 910*a* of the lower brushes 910 are caulked and thereby electrically and mechanically joined to a concave portion 920 formed in the rear surface of the brush holder 900. In this embodiment a pair of lower brushes 910 are provided, one lead wire 910*a* is connected to the pair of lower brushes 910, and the middle of the lead wire 910*a* is caulked in the concave portion 920 formed in the rear surface of the brush holder 900**.

Two seats 930 with which the front side of the magnet switch 600 abuts and two fixing pillars 940 which hold the periphery of the magnet switch 600 are formed on the rear side of the brush holder 900.

The seats 930 are shaped to match the external shape of the magnet switch 600 in order to abut with the magnet switch 600, which has a cylindrical exterior. The two fixing pillars 940, with the magnet switch 600 in abutment with the seats 930, by having their rear ends caulked to the inner side, hold the magnet switch 600.

A pulley holding portion 950 which holds a pulley 690 which converts the direction of movement of the cord-shaped member 680 from the vertical direction of the magnet switch 600 into the axial direction thereof is formed on the lower side of the rear side of the brush holder 900.

(Operation of the Invention)

Next, the operation of the starter described above will be explained with reference to the electrical circuit diagrams FIGS. 15A through 15C.

Figure 15A:
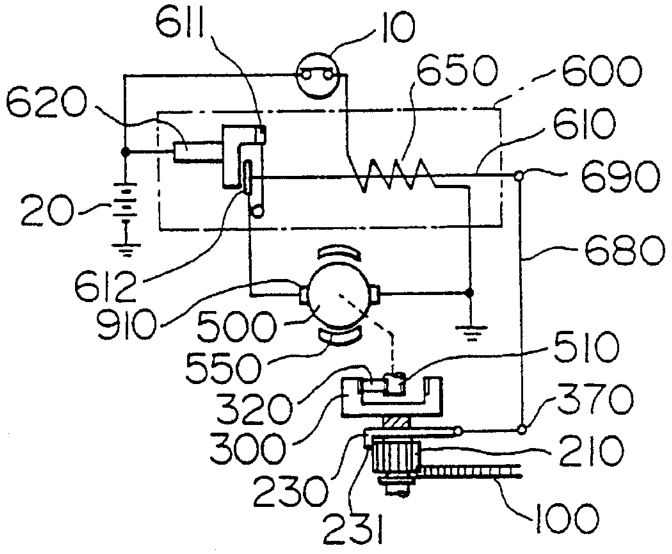
FIGS. 15A through 15C are electrical circuit diagrams in which the operating state of a pinion is shown.

When a key switch 10 is set to the start position by a driver as shown in FIG. 15A, electricity flows from a battery 20 to the attracting coil 650 of the magnet switch 600. When current flows through the attracting coil 650, the plunger 610 is pulled by the magnetic force produced by the attracting coil 650, and the plunger 610 ascends from its lower position to its upper position (from right to left in FIG. 15A).

When the plunger 610 starts to ascend, together with the ascent of the plunger shaft 615 the upper movable contact 612 and the lower movable contact 611 ascend, and the rear end of the cord-shaped member 680 also ascends. When the rear end of the cord-shaped member 680 ascends, the front end of the cord-shaped member 680 is pulled down, and the pinion rotation regulating member 230 descends. When the descent of the pinion rotation regulating member 230 causes the regulating claw 231 to mate with the projections 214 of the periphery of the pinion gear 210, the lower movable contact 611 abuts with the head portion 621 of the terminal bolt 620. The voltage of the battery 20 is impressed on the terminal bolt 620, and the voltage of the terminal bolt 620 is transmitted through the lower movable contact 611→the resistor member 617→the upper movable contact 612→the lead wires 910*a* to the upper brushes 910. That is, the low voltage passing through the resistor member 617 is transmitted through the upper brushes 910 to the armature coils 530. Because the lower brushes 910 are constantly grounded through the brush holder 900, a current flows at low voltage through the armature coils 530 constituted in coil form by the paired upper layer coil bars 531 and lower layer coil bars 532. When this happens, the armature coils 530 generate a relatively weak magnetic force, this magnetic force acts on (attracts or repels) the magnetic force of the fixed poles 550, and the armature 540 rotates at low speed.

When the armature shaft 510 rotates, the planetary gears 320 of the planetary gear speed reduction mechanism 300 are rotationally driven by the sun gear 310 on the front end of the armature shaft 510. When the planetary gears 320 exert a rotational torque through the planet carrier 330 on the internal gear 340 in the direction which rotationally drives the ring gear 100, the rotation of the internal gear 340 is limited by the operation of the overrunning clutch 350. That is, because the internal gear 340 does not rotate, the rotation of the planetary gears 320 causes the planet carrier 330 to rotate at low speed. When the planet carrier 330 rotates, the pinion gear 210 also rotates, but because the pinion gear 210 has its rotation limited by the pinion rotation regulating member 230 the pinion gear 210 advances along the helical spline 221 on the output shaft 220.

Together with the advance of the pinion gear 210, the shutter 420 also advances, and opens the opening portion 410 of the housing 400. The advance of the pinion gear 210 causes the pinion gear 210 to mesh completely with the ring gear 100 and then abut with the pinion stopping ring 250. Also, when the pinion gear 210 advances, the regulating claw 231 disengages from the projections 214 of the pinion gear 210 and after that the front end of the regulating claw 231 drops to the rear side of the washer 215 disposed on the rear side of the pinion gear 210.

Figure 15B:
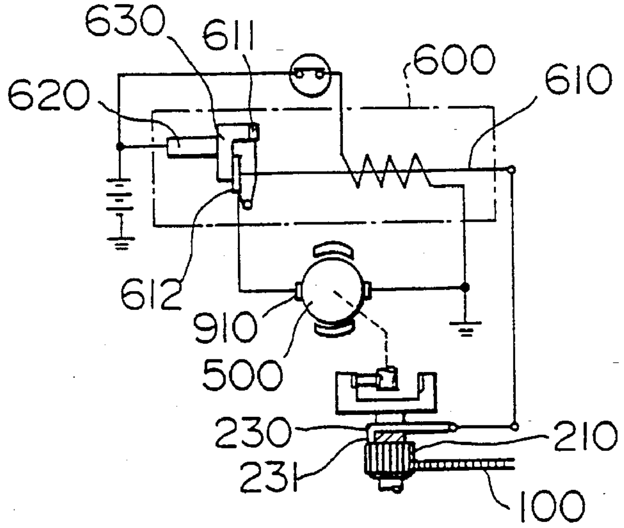

With the pinion gear 210 advanced, the upper movable contact 612 abuts with the abutting portion 631 of the fixed contact 630 as shown in FIG. 15B. When this happens, the battery voltage of the terminal bolt 620 is directly transmitted through the upper movable contact 612→the lead wires 910*a* to the upper brushes 910. That is, a high current flows through the armature coils 530 consisting of the upper coil bars 531 and the lower coil bars 532, the armature coils 530 generate a strong magnetic force and the armature 540 rotates at high speed.

The rotation of the armature shaft 510 is slowed and has its rotational torque increased by the planetary gear speed reduction mechanism 300 and rotationally drives the planet carrier 330. At this time, the front end of the pinion gear 210 abuts with the pinion stopping ring 250 and the pinion gear 210 rotates integrally with-the planet carrier 330. Because the pinion gear 210 is meshing with the ring gear 100 of the engine, the pinion gear 210 rotationally drives the ring gear 100 and rotationally drives the output shaft of the engine.

Next, when the engine starts and the ring gear 100 of the engine rotates faster than the rotation of the pinion gear 210, the action of the helical spline creates a force tending to retract the pinion gear 210. However, the regulating claw 231 which has dropped to behind the pinion gear 210 prevents the pinion gear 210 from retracting, prevents early disengagement of the pinion gear 210, and enables the engine to be started surely.

When the engine starting causes the ring gear 100 to rotate faster than the rotation of the pinion gear 210, the rotation of the ring gear 100 rotationally drives the pinion gear 210. When this happens, the rotational torque transmitted from the ring gear 100 to the pinion gear 210 is transmitted through the planet carrier 330 to the pins 332 which support the planetary gears 320. That is, the planetary gears 320 are driven by the planet carrier 330. When this happens, because a torque rotationally opposite to that during engine starting is exerted on the internal gear 340, the overrunning clutch 350 allows the rotation of the ring gear 100. That is, when a torque rotationally opposite to that during engine starting is exerted on the internal gear 340, the roller 353 of the overrunning clutch 350 detaches to outside the concave portion 355 of the clutch inner 352 and rotation of the internal gear 340 becomes possible.

In other words, the relative rotation with which the ring gear 100 rotationally drives the pinion gear 210 when the engine starts is absorbed by the overrunning clutch 350, and the armature 540 is never rotationally driven by the engine.

Figure 15C:
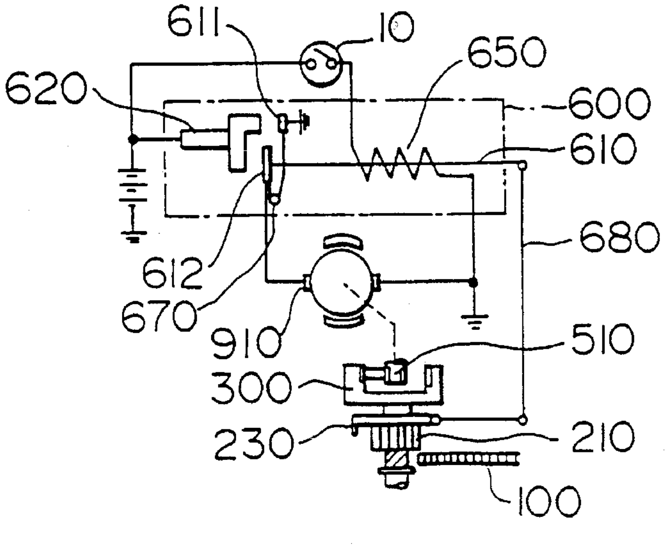

When the engine starts, the driver releases the key switch 10 from the start position as shown in FIG. 15C and the flow of current to the attracting coil 650 of the magnet switch 600 is stopped. When the flow of current to the attracting coil 650 stops, the plunger 610 is returned downward by the action of the compression coil spring 660.

When this happens, the upper movable contact 612 moves away from the abutting portion 631 of the fixed contact 630, and after that the lower movable contact 611 also moves away from the head portion 621 of the terminal bolt 620, and the flow of current to the upper brushes 910 is stopped.

When the plunger 610 is returned downward, the action of the return spring portion 236 of the pinion rotation regulating member 230 causes the pinion rotation regulating member 230 to return upward, and the regulating claw 231 moves away from the rear of the pinion gear 210. When this happens, the pinion gear 210 is returned rearward by the action of the return spring 240, the meshing of the pinion gear 210 with the ring gear 100 of the engine is disengaged, and the rear end of the pinion gear 210 abuts with the flange-like projecting portion 222 of the output shaft 220. That is, the pinion gear 210 is returned to the position it was in before the starter was started.

Also, the plunger 610 being returned downward causes the lower movable contact 611 to abut with the upper surface of the stationary core 642 of the magnet switch 600, and the lead wires of the upper brushes 910 conduct electrical current in the order the upper movable contact 612→the resistor member 617→the lower movable contact 611→the stationary core 642→the magnet switch cover 640→the brush holder 900. In other words, the upper brushes 910 and the lower brushes 910 short-circuit through the brush holder 900. Meanwhile, inertial rotation of the armature 540 generates an electromotive force in the armature coils 530. Because this electromotive force is short-circuited through the upper brushes 910, the brush holder 900 and the lower brushes 910, a braking force is exerted on the inertial rotation of the armature 540. As a result, the armature 540 rapidly stops.

(Advantages of the Embodiment)

According to the starter described above, the magnet switch 600 is set apart from the pinion 210 so the distance between the plunger 510 of the magnet switch 600 and the pinion rotation regulating member 230 can be lengthened, and the cord-shaped member 680 that acts as the coupling means can be lengthened. T herefore, the impact force generated when the pinion 210 and ring gear 100 engage can be absorbed by this long cord-shaped member, and prevented from being conveyed directly to the plunger 621. Thus vibration of the plunger 610 is eliminated, and separation between the lower movable contact 611 and terminal bolt 620 can be accurately prevented.

As the pinion gear 210 is moved to the ring gear 100 side via the cord-shaped member and via the pinion rotation regulating member 230, the conventional link mechanism and levers, etc., are not required, by that reducing the number of parts. Even if the pinion gear 210 does not separate from the ring gear 100 when the pinion gear 210 is engaged with the ring gear 100, the plunger 610 returns to the original position due to the slackening of the cord-shaped member, and the movable contacts 611 and 612 separate from the fixed contact 630.

As the rotation of pinion gear 210 is restricted by moving the pinion rotation regulating member 230 to the pinion gear 610 side, the strong force conventionally required to rub the regulating portion against the pinion is not required, so the pinion rotation regulating member 230 can be accurately moved with the cord-shaped member 680.

As the regulating claw 231 of the pinion rotation regulating member 230 only need to be fit with the groove 213 formed on the pinion gear 210, the regulating claw can be accurately moved by the cord-shaped member 680.

By using a wire for the cord-shaped member, the durability can be improved.

By laying the adjustment mechanism configured of the male screw 683 and fixing screw 684 between the plunger 610 and cord-shaped member 680, the length of the cord-shaped member can be easily determined.

Furthermore, the length of the cord-shaped member can be easily adjusted by screwing the fixing screw 684 that acts as the adjustment member into the concave portion 682.

Furthermore, by laying the cord-shaped member between the plunger 610 of the magnet switch 600 and the pinion rotation regulating member 230 that acts as the pinion regus lating means, and passing the member through the field magnetic pole 550 of the starter motor 500, the conventional link mechanism and levers, etc., are not required, by that reducing the number of parts. Even if the pinion gears 210 do not separate from the ring gear 100 when the pinion gear 210 is engaged with the ring gear 100, the plunger 610 returns to the original position due to the slackening of the cord-shaped member, and the movable contacts 611 and 612 separate from the fixed contact 630.

At the same time, the cord-shaped member 680 is passed through the small clearance between the field magnetic poles 550 so a space does not need to be created for the cord-shaped member 680.

Figure 16:
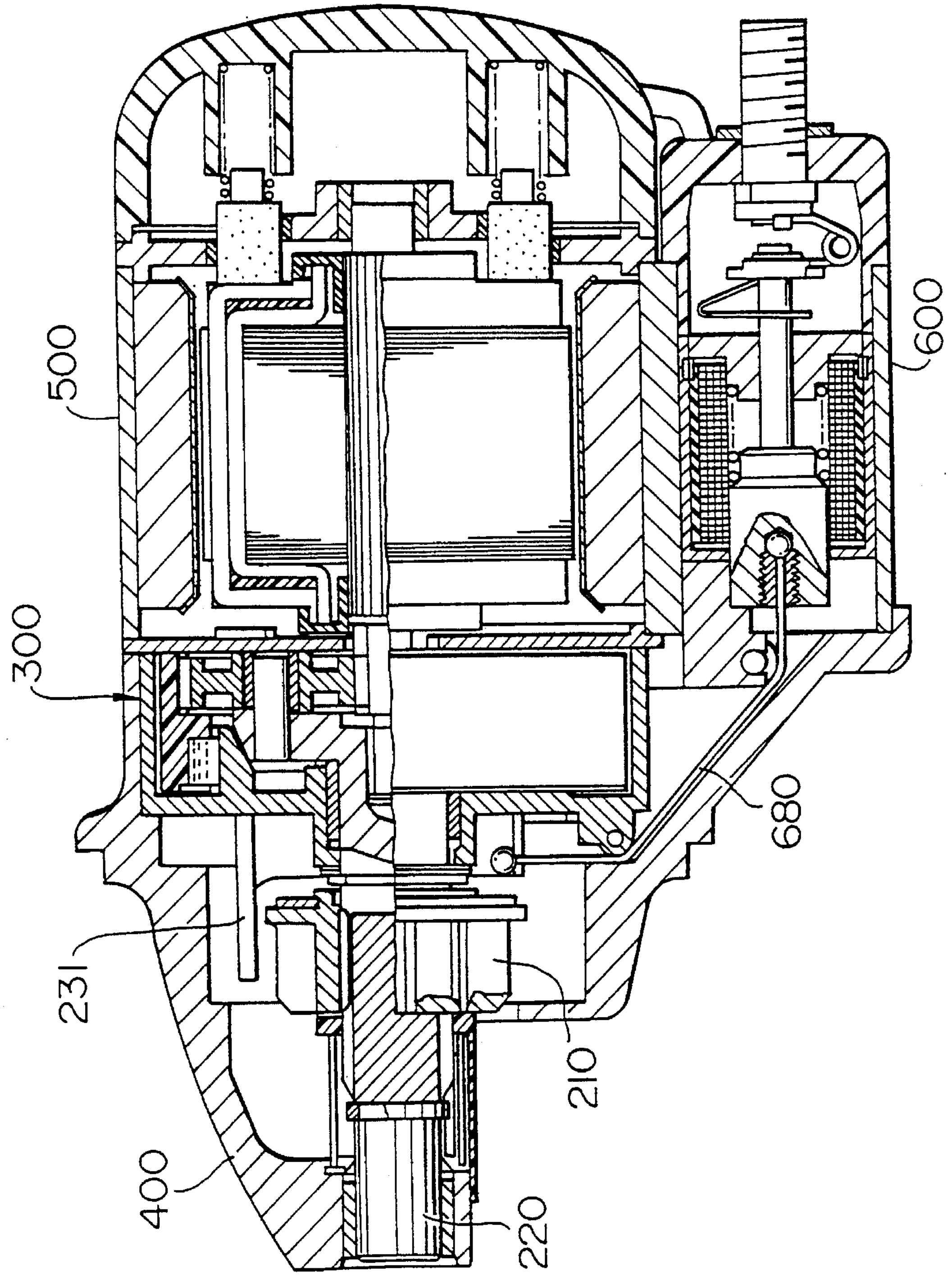
FIG. 16 is a sectional view of the second embodiment of the present invention.

It is to be noted that, in the second embodiment illustrated in FIG. 16, the magnet switch 600 is laid in parallel with the starter motor 500, while using the cord-shaped member 680 in the similar manner as in the first embodiment.

The present invention has been described with reference to two embodiments. However, it should not be limited to the above embodiments but may be modified in many ways without departing from the spirit of the invention.

What is claimed is:

1. A starter comprising:

a starter motor including a cylindrical yoke, field magnetic poles fixed to an inside surface of the yoke and an armature rotatably supported inside the poles;

an output shaft disposed at one axial side of the armature to be driven by the starter motor;

a pinion provided on the output shaft and engageable with a ring gear of an engine;

a magnet switch disposed at another axial side of the armature and having a fixed contact and a plunger which has a movable contact, the magnet switch energizing the starter motor when the movable contact contacts the fixed contact by a movement of the plunger;

pinion movement means to move the pinion to the ring gear; and a cord-shaped member connecting the plunger of the magnet switch and the pinion movement means and extending axially between the armature and the yoke;

wherein the pinion is moved to the ring gear when the cord-shaped member is pulled tight by the movement of plunger.

2. The starter according to claim 1, wherein the pinion movement means includes pinion rotation regulating member which restricts rotation of the pinion, and wherein the regulating member moves the pinion to the ring gear along with rotation of the output shaft while restricting rotation of the pinion by the cord-shaped member pulled tight by the plunger of the magnet switch.

3. The starter according to claim 2, wherein the pinion has at least one axial groove portion formed in an outer circumferential surface thereof and the regulating member has a restriction portion that fits with a said groove portion of the pinion, and wherein the restriction portion is fit with the pinion groove via the cord-shaped member by movement of the plunger.

4. The starter according to claim 1, wherein said cordhaped member is a wire.

5. The starter according to claim 1 further comprsing:

an adjustment mechanism provided between the cord-shaped member and the plunger to adjust the length of the cord-shaped member.

6. The starter according to claim 5, wherein a hole portion is set in the plunger, an adjustment member is threaded into the hole portion, and the cord-shaped member is fixed to the adjustment member, whereby a length of the cord-shaped member is adjusted by screwing the adjustment member into the hole portion.

7. The starter according to claim 1, wherein the pinion is coupled with the output shaft through helical spline.

8. A starter comprising:

a starter motor including field magnetic poles and an armature disposed inside the field magnetic poles;

an output shaft driven by the starter motor;

a pinion provided on the output shaft and engageable with a ring gear of an engine;

a magnet switch disposed at an axial side of the starter motor oppositely to the pinion, said magnet switch having a fixed contact and a plunger which has a movable contact that energizes the starter motor when the movable contact contacts the fixed contact by the movement of the plunger;

pinion regulating means to regulate at least one of pinion operations including a pinion movement toward the ring gear and a pinion disengagement from the ring gear; and a connecting member to drive the pinion regulating means by the plunger of the magnet switch, wherein the connecting member extends axially through a space existing radially outside the armature.

9. The starter according to claim 8, wherein:

the pinion regulating means includes a pinion rotation regulating member which, when pulled tight by the plunger of the magnet switch, restricts rotation of the pinion to move the pinion toward the ring gear while restricting rotation of the pinion.

10. The starter according to claim 8, wherein:

the pinion regulating means includes a disengagement preventing member which, when the pinion engages the ring gear, is moved to locate adjacently to the pinion at a side of the starter motor to prevent return of the pinion toward the starter motor.

11. The starter according to claim 8, wherein:

the starter motor includes a generally cylindrical housing fixedly supporting the field magnetic poles on an inner circumferential surface thereof; and the connecting member is disposed inside the housing.

12. The starter according to claim 11, wherein:

the connecting member is disposed in a space between adjacent two of the field magnetic poles.

13. The starter according to claim 11, further comprising:

a cover member covering the magnet switch and having substantially the same diameter as the housing of the starter motor.

14. The starter according to claim 8, further comprising:

an adjustment mechanism provided between the connecting member and the plunger to adjust a length between the plunger and the pinion regulating means.

15. The starter according to claim 14, wherein:

the plunger includes a hole;

the connecting member includes a flexible cord; and the adjustment mechanism includes a movable member threaded into the hole and connected to the flexible cord.

16. The starter according to claim 8, wherein:

the connecting member includes a flexible cord.

* * * * *